J. F. SCHAINOST.
ADJUSTABLE COLTER FOR PLOWS.
APPLICATION FILED AUG. 20, 1913.
1,135,403.
Patented Apr. 13, 1915.
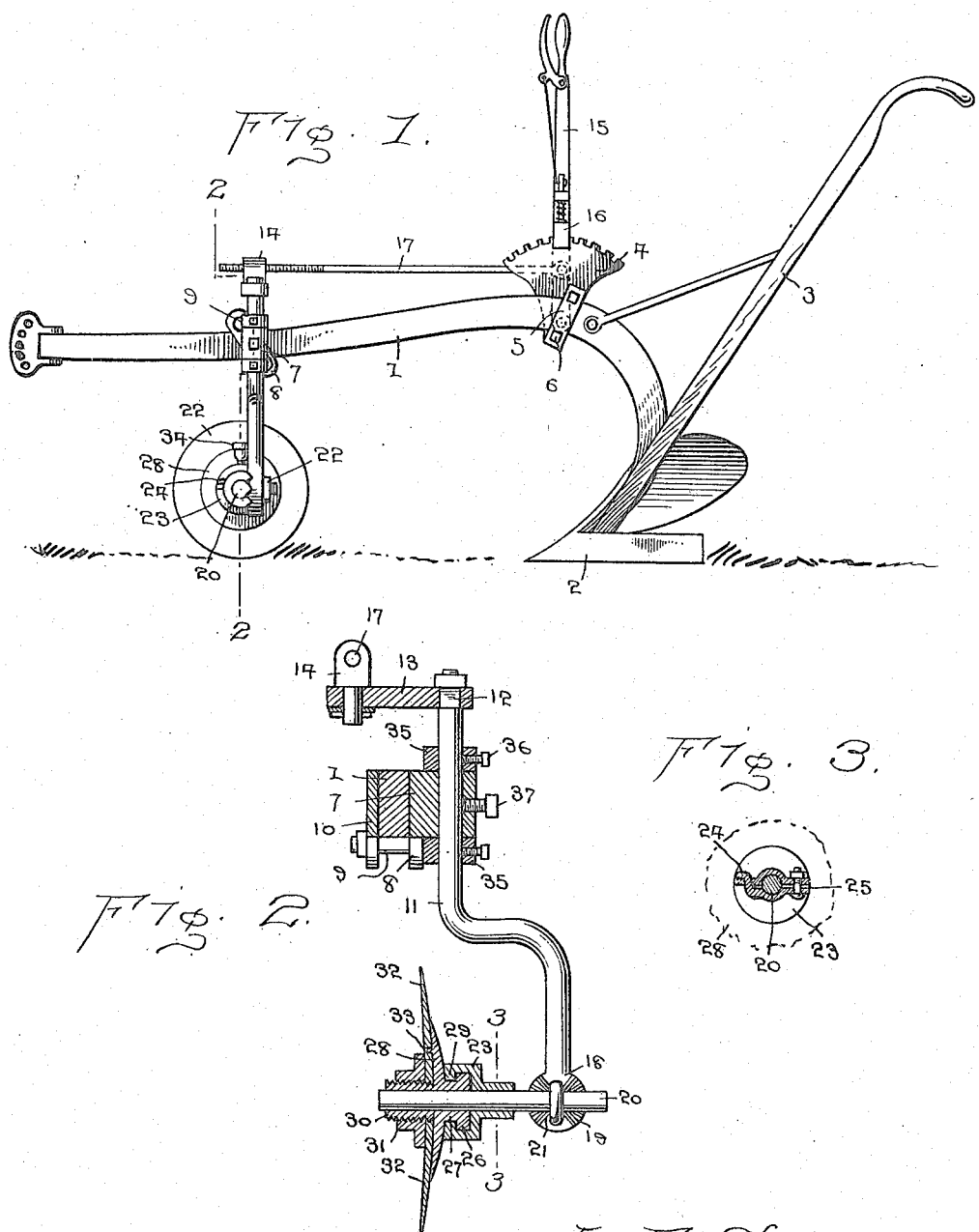

UNITED STATES PATENT OFFICE.

JOSEPH F. SCHAINOST, OF BLOOMFIELD, NEBRASKA.

ADJUSTABLE COLTER FOR PLOWS.

1,135,403.  Specification of Letters Patent.  Patented Apr. 13, 1915.

Application filed August 20, 1913. Serial No. 785,776.

*To all whom it may concern:*

Be it known that I, JOSEPH F. SCHAINOST, a citizen of the United States, residing at Bloomfield, in the county of Knox and State of Nebraska, have invented certain new and useful Improvements in Adjustable Colters for Plows; and I do hereby declare the following to be a full, clear, and exact description of the invention, such as will enable others skilled in the art to which it appertains to make and use the same.

This invention relates to plows, and more particularly to a disk colter to be used in connection with single or with gang plows.

One of the principal objects of my invention is to provide a disk colter, and means for operating the same, which may be quickly and easily secured to any ordinary plow beam and without the use of special tools.

A further object is to provide a disk colter which may be secured to a plow beam, said colter being adjustable both vertically and horizontally.

A still further object is to provide a disk colter which will be simple, durable, efficient in operation, and inexpensive to manufacture.

With these and other objects in view, the invention consists in the construction, combination and arrangements of parts hereinafter more fully described and claimed and illustrated in the accompanying drawing, in which like reference characters indicate like parts throughout the several views, and in which, Figure 1, represents a side elevational view of a plow with my invention attached thereto. Fig. 2, represents a vertical transverse sectional view on the line 2—2 of Fig. 1. Fig. 3, is a transverse sectional view on the line 3—3 of Fig. 2.

Referring more particularly to the drawing, 1, represents a plow beam of ordinary construction on which is secured a plow 2, and handles 3. A toothed segment 4, is secured to the plow beam near the rear end thereof, by means of a clip 5, said clip carrying a pair of bolts 6, which embrace the beam 1, and pass through the segment so as to securely lock the segment on the plow beam. Near the forward end of the plow beam, a block 7, having ears 8, formed thereon is secured to said beam, by means of bolts 9, which pass through said ears and through a clip 10. The block 7, is vertically bored to provide a journal to rotatably receive the upper end of a supporting bar 11, the lower end of which is offset to one side of the plow beam 1. The upper end of the bar 11, is squared as at 12, to receive the squared opening of an arm 13, formed in one end of said arm, the opposite end of which rotatably receives the reduced shank or pin of a swivel 14, said pin being secured in said arm by means of a washer and nut. A lever 15, provided with a dog 16, is pivoted at its lower end, near the lower end of the segment 4, and a reach rod 17, has one end pivoted to said lever and the other end adjustably threaded into the swivel 14. The lower end of the bar 11, is formed with an eye 18, and said eye is provided with a plurality of radial V-shaped notches 19, adapted to receive the V-shaped edge of an axle 20, said axle being V-shaped only at its inner end. An eye bolt 21, embraces the axle 20, and secures the same in adjustable position on the bar 11, by means of a nut 22.

The outer end of the axle 20 is rounded, and has secured thereon a two piece bearing box 23, one portion of which as shown in Fig. 3, is provided with a slot adapted to receive a tongue 24, formed on the other portion, the sections being secured together by means of bolts 25. The bearing box 23 is adapted to rotatably receive a flange 26, formed on the shank 27 of a circular plate 28, said box having an annular flange 29, which engages said shank between the flange 26 and the body portion of the plate. At the opposite side of the plate 28, from the shank 27, is formed a threaded nipple 30, which is bored centrally as is the plate and shank, for receiving the axle 20, and said nipple is adapted to receive a threaded collar 31, for securing a disk 32 to the plate 28, said plate being provided with a plurality of lugs 33, which engage registering openings in the disk 32, for preventing movement of said disk relative to said plate. A grease cup 34, is provided on the box 23, for lubricating the bearing portion of the plate 28.

A pair of collars 35 are provided on the bar 11, one above and one below the block 7, and said collars are adapted to be adjustably secured to said bar by means of set screws 36, for holding said bar in raised or lowered position relative to said block. A set screw 37, is provided in the block 7, for preventing rotation of the bar 11, should it be desired to hold the disk 32 against longitudinal adjustment relative to the longitudinal vertical plane of the plow beam. It is evident that, should it be desired to hold said disk in said fixed adjustment, the arm 13, rod 17, and segment 4, may be removed from the plow. It is evident that by this construction, adjustment of the disk, relative to the longitudinal vertical plane of the plow beam 1, may be had by means of the lever 15, and that said disk may be adjusted vertically by means of the collars 35, and that it is also capable of adjustment by means of adjustment of the axle 20, so that said disk may be set at any desired angle for reducing side draft or for taking more or less land, or for turning stubbles.

Should it be desired to use this disk colter in connection with a gang plow, one or more rods could be run from the lever 15, for operating each of the colters.

Although I have described the preferred embodiment of my invention, I may make such changes in the construction, combination and arrangement of parts as do not depart from the spirit of the invention and the scope of the appended claims.

Having fully described my invention, what I claim as new and desire to secure by Letters-Patent is, 1. In combination with a plow, a segment secured to the beam thereof, a lever pivoted on said segment, a bar rotatably connected with said beam, connecting means between said bar and lever, an axle carried by said bar, a disk rotatable on said axle, and an eye-bolt upon said bar and embracing said axle for holding said axle in both lateral and angular adjusted position relative to said bar.

2. In combination with a plow, a segment secured to the beam thereof, a lever pivoted on said segment, a journal block secured to said beam, a supporting member rotatably mounted and vertically adjusted within said block, a lateral extending arm fixedly secured to the upper end of said supporting bar, a swivel arranged in one end of said arm, a reach rod pivotally connected to said lever at one end thereof and adjustably connected to said swivel at the opposite end thereof for operating said arm, bearings adjustably secured upon said bar for retaining said bar in predetermined vertical adjustment within said journal, an axle arranged at the lower end of said supporting bar, an eye bolt arranged upon the said bar and embracing said axle for securing said axle upon said supporting bar, and a disk rotatably mounted upon said axle, whereby said disk is oscillated longitudinally with respect to the vertical longitudinal plane of said beam by said lever and said connections.

In testimony whereof I have signed my name to this specification in the presence of two subscribing witnesses.

JOE F. SCHAINOST.

Witnesses:
WILLIAM H. HERM,
HENRY C. PATERSON.

Copies of this patent may be obtained for five cents each, by addressing the "Commissioner of Patents, Washington, D. C."